United States Patent [19]

Sweatt et al.

[11] Patent Number: 5,473,475
[45] Date of Patent: Dec. 5, 1995

[54] METHOD FOR CHANGING THE CROSS SECTION OF A LASER BEAM

[75] Inventors: William C. Sweatt, Albuquerque, N.M.; Lynn Seppala, Livermore, Calif.

[73] Assignee: The United States of America as represented by the United States Department of Energy, Washington, D.C.

[21] Appl. No.: 10,935

[22] Filed: Jan. 29, 1993

[51] Int. Cl.⁶ ........................................... G02B 5/08
[52] U.S. Cl. ........................ 359/869; 359/846; 359/868; 372/99
[58] Field of Search ........................... 372/99, 101, 102, 372/103, 107, 108; 359/869, 846, 867, 868, 641, 894, 640; 219/121.74

[56] References Cited

U.S. PATENT DOCUMENTS

| | | | |
|---|---|---|---|
| 4,173,036 | 10/1979 | Ferguson | 359/869 X |
| 4,195,913 | 4/1980 | Dourte et al. | 359/853 |
| 4,278,867 | 7/1981 | Tan | 219/121.74 |
| 4,484,334 | 11/1984 | Pressley | 372/101 |
| 4,734,550 | 3/1988 | Imamura et al. | 219/121 |
| 4,811,328 | 3/1989 | Ito et al. | 359/640 |
| 5,138,490 | 8/1992 | Hohberg et al. | 219/121.74 X |

OTHER PUBLICATIONS

"Transforming a Circular Laser Beam into a Square or Trapezoid–Almost", William C. Sweatt, Optical Engineering, Feb. 1992, vol. 31 No. 2 pp. 245–250.

Gary J. Swanson, et al. "Diffractive Optical Elements for Use in Infrared Systems" Optical Engineering, Jun. 1989, vol. 28 No. 6, pp. 605–608.

Carl C. Ajeksoff, et al. "Holographic Conversion of a Gaussian Beam to a Near–Field Uniform Beam" Optical Engineering, May 1991, vol. 30 No. 5, pp. 537–540.

Joseph M. Geary, "Strip Mirror Integrator for Laser Beam Uniformity on a Target" Optical Engineering, Aug. 1989, vol. 28 No. 8, pp. 859–864.

Olof Bryngdahl, "Geometrical Transformations in Optics", Journal of The Optical Society of America, vol. 64, No. 8, pp. 1092–1099, Aug. 1974.

Primary Examiner—Rodney B. Bovernick
Assistant Examiner—Hemang Sanghavi
Attorney, Agent, or Firm—Miguel A. Valdes; William C. Daubenspeck; William R. Moser

[57] ABSTRACT

A technique is disclosed herein in which a circular optical beam, for example a copper vapor laser (CVL) beam, is converted to a beam having a profile other than circular, e.g. square or triangular. This is accomplished by utilizing a single optical mirror having a reflecting surface designed in accordance with a specifically derived formula in order to make the necessary transformation, without any substantial light loss and without changing substantially the intensity profile of the circular beam which has a substantially uniform intensity profile. In this way, the output beam can be readily directed into the dye cell of a dye laser.

17 Claims, 2 Drawing Sheets

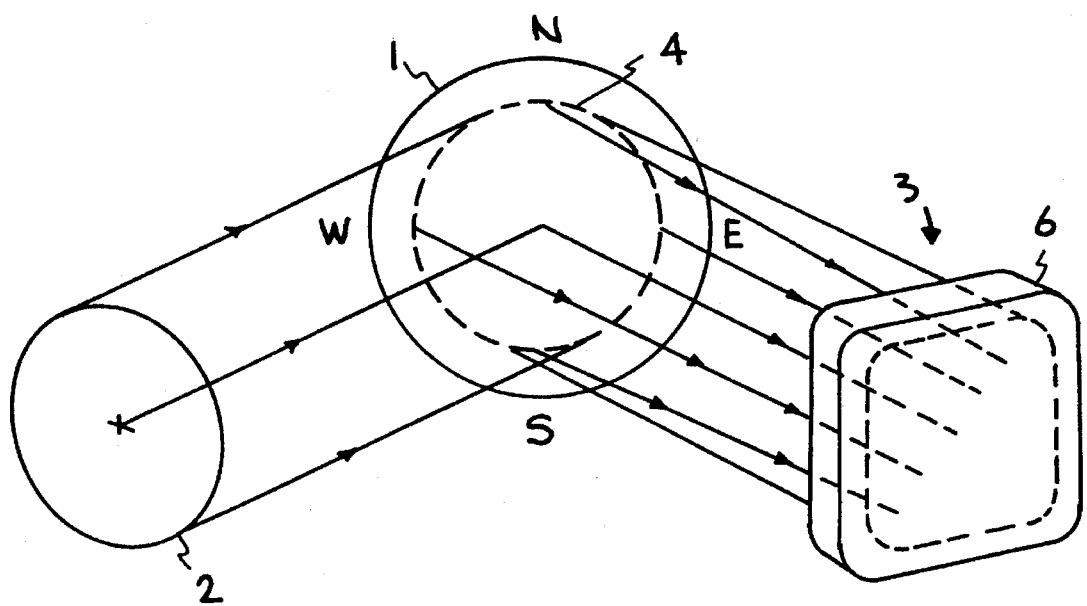
FIG. 1
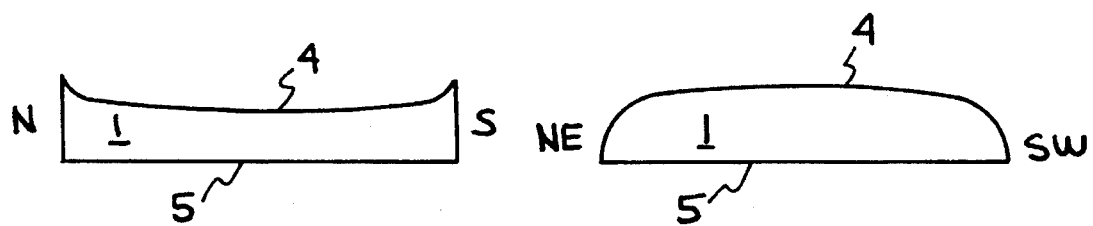
FIG. 2A  FIG. 2B

METHOD FOR CHANGING THE CROSS SECTION OF A LASER BEAM

ORIGIN OF THE INVENTION

The United States Government has rights in this invention pursuant to Contract No. W-7405-ENG-48 between the U.S. Department of Energy and the University of California.

FIELD OF THE INVENTION

This invention relates to a laser beam reshaping system, i.e. a system which will reshape a laser beam having a circular cross-section to one having a square, triangular or other polygonal cross-section. The structure and method of the invention include a single mirrored surface element having a defined reflective surface shape to accomplish this end. For simplicity, beams which have a circular cross-section will be referred herein as "round," beams which have a square cross-section will be referred to as "square," and beams which have a triangular cross-section will be called "triangular" or "trapezoidal."

BACKGROUND OF THE INVENTION

The present invention is addressed to the problem of trying to most efficiently fit a round laser beam in a square, triangular or other shaped hole, where the hole is, for example, the aperture in a side-pumped dye laser. Pump laser beams are round and therefore lose efficiency when coupled into apertures having other shapes, such as a square aperture commonly used in a side-pumped dye laser.

Several beam reshaping systems have previously been developed. However, these reshaping systems are complex and not particularly useful for use in laser chemistry and with laser pump beams.

Numerous authors have developed methods of transforming collimated laser beams with Gaussian intensity profiles into other intensity profiles. Circularly symmetric transformations have been developed for creating top-hat intensity profiles from Gaussian intensities. A square beam with uniform intensity can also be created from a Gaussian beam, as well as other separable shapes such as sinc-squared intensity profiles. These transformations make use of the separability of the Gaussian function —that is, $\exp(-Kr^2) = \exp(-Kx^2) \exp(-Ky^2)$. Basically, a rectangular section of the Gaussian profile is remapped into another rectangle with the desired intensity profile. A Gaussian-to-square transform and a good bibliography is described in C. C. Aleksoff, K. K. Ellis and B. D. Neagle, "Holographic conversion of a Gausian beam to a near-field uniform beam." *Opt. Eng.* 30(5):537–543 (1991).

Bryngdahl proposes a beam reshaping system based on a Fourier optical processor geometry. O. Bryngdahl, "Geometrical transforms in optics," *J. Opt. Soc. Amer.* 64(8):1092–1099 (1974). This system includes a object plane mask, a Fourier transform lens, the Fourier plane mask, a recollimating lens, and an image plane mask. Both lenses have a focal length L, and the spacing between each successive pair of elements in the system is L. Bryngdahl's scheme locates a beam-aberrating element somewhat similar to ours, in the object plane. This element tilts different parts of the beam so they arrive at different locations on the transform plane. The Fourier mask changes the ray angles so that the second lens will image the ray bundle into the desired shape, for example, a square at the image plane. Finally, a recollimating element is needed in the image plane.

This system can reshape a round laser beam into a square, but is not particularly applicable for laser chemistry or pump beams, and is complex, possessing five elements. Furthermore, lasers used in these applications usually have high-peak powers, so the focus on the Fourier transform plane could damage the mask.

A totally different method of creating a square patch of light with uniform intensity uses a multifaceted mirror. U.S. Pat. No. 4,195,913 (1990); J. M. Geary, "Strip mirror integrator for laser beam uniformity on a target," *Opt. Eng* 28(8), 859–864 (1989). The faceted mirror is an array of square mirrors, each tilted so that the collection of "beamlets" overlap at an "image plane" a given distance away. The multifaceted mirror approach is a simple and effective method of creating a square beam with uniform intensity. The convergence angles, however, are quite large, so the axial distance over which there is a good "image" is very short. Hence, this method is not appropriate for the applications mentioned above.

Thus, there is need for an improved means of converting round laser beams to other shapes in a way which is simple yet which results in a minimum loss of efficiency.

SUMMARY OF THE INVENTION

In order to meet this need, and in its most general form, the present invention is directed to a laser beam reshaping system comprising a mirror having a laser beam reflective surface for converting an incident laser beam having a circular cross-section to a beam having a polygonal cross-section.

Thus, the invention is a laser beam reshaping system comprising a mirror having a laser beam reflective surface for converting an incident laser beam having a circular cross-section to an output beam having a polygonal cross-sectional shape at a distance L from said surface, said mirror defining a mirror plane and an axis Z normal to said mirror plane, each point on said reflective surface being described by the equation:

$$W_m(r,\beta) = k_m R^2/L \, (r/R)^m \cos(m\beta)$$

where m equals the number of sides of said polygonal shape, W is the deviation of said reflective surface from said mirror plane along said Z axis, R is the radius of said incident beam, r and $\beta$ are the cylindrical coordinates of said points on said mirror plane, and $k_m$ is a variable empirically selected to optimize the balance between variations in beam intensity and the degree to which said polygon is filled with said output beam.

In a preferred embodiment, where conversion of the beam is to be from round to square, m is 4 and $k_m$ is in the range −0.015 to −0.05, and most preferrably −0.030. In another preferred embodiment, where conversion of the beam is to be from round to triangular, m is 3 and $k_m$ is in the range −0.030 to −0.15, and most preferrably −0.060.

BRIEF DESCRIPTION OF THE DRAWINGS

FIG. 1 depicts an incoming and outgoing laser beam and a mirror having a surface shaped to convert the cross-section of the incoming beam to a square beam;

FIGS. 2A and 2B show exaggerated cross-sections of the mirror of FIG. 1; and

DETAILED DESCRIPTION OF THE PREFERRED EMBODIMENT

Figure 3:
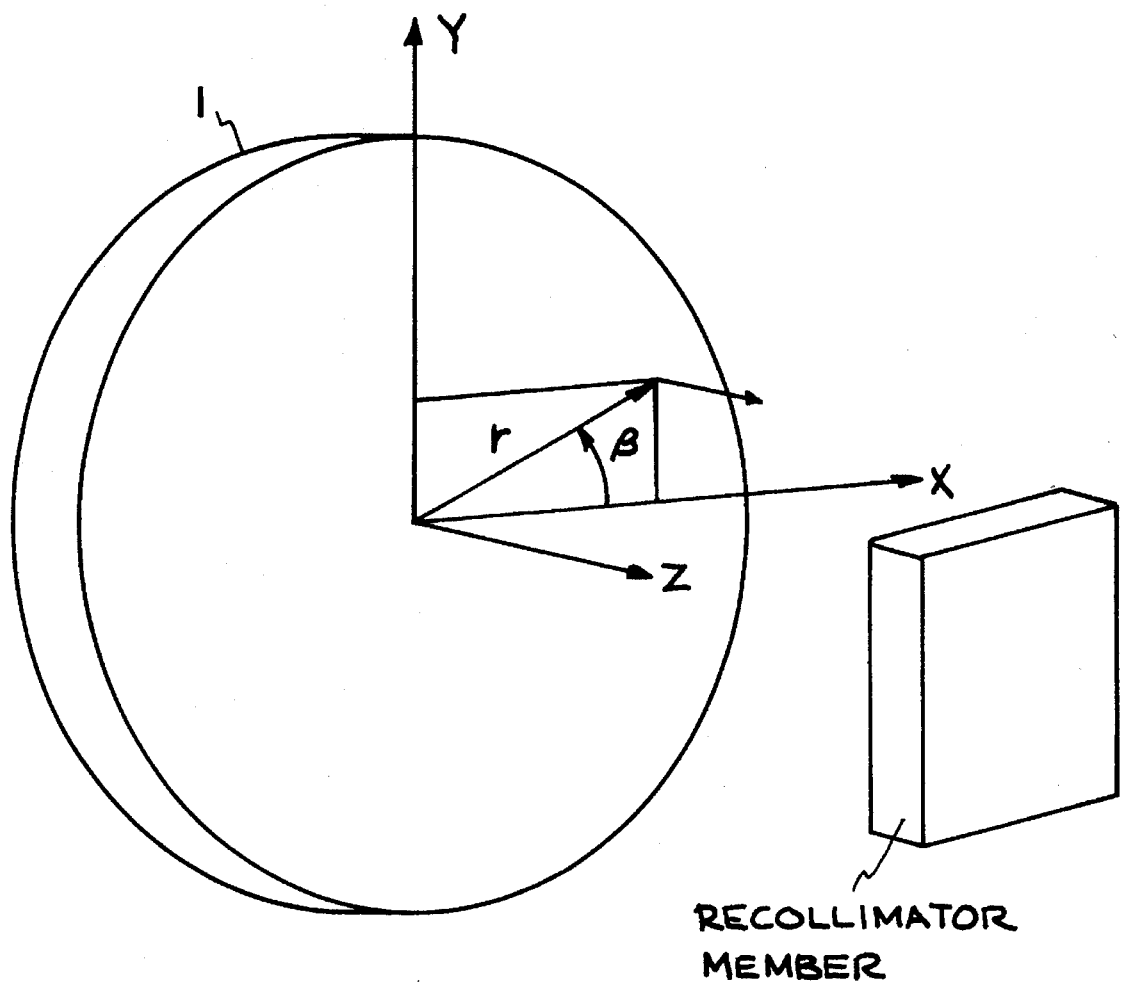
FIG. 3 shows the coordinate system used to define the elements of the relationship which can be used to define points on the reflective surface of the mirror.

The instant invention provides a simple and efficient method and device for converting a round pump beam into a beam having a different shape, such as square or triangular. The system creates a collimated beam with rounded corners which has a relatively uniform intensity profile.

As shown in FIGS. 1 and 2, the invention utilizes a single optical device, specifically a specially shaped mirror, to make the transformation from an optical beam (for example a CVL beam) which is round and has a uniform intensity profile to a beam which is (in the example of FIG. 1) square and retains a uniform intensity profile.

Referring to FIG. 1, it can be seen that mirror 1 can be used to transform a round incoming laser beam 2 to a square beam 3. In order to accomplish this, the surface 4 of mirror 1 is shaped in a manner which is shown in exaggerated fashion in FIGS. 2A and 2B. In FIGS. 2A and 2B the reverse side 5 of mirror 1 is shown as flat, though this is unimportant with respect to the manner in which surface 2 of the mirror is shaped. FIG. 2A is a cross-section of mirror 1 from "north" to "south" in FIG. 1. The same cross-section would appear if the section was taken along the "east-west" line of FIG. 1. In FIG. 2A the outer edge of surface 4 is shown as forming a relatively concave surface. Thus, portions of a round, incoming, laser beam are deflected inwardly to form the sides of the outgoing square beam.

FIG. 2B is a cross-section of mirror 1 of FIG. 1 along the "northeast-southwest" line. The same cross-section would be seen if the section was taken along the "northwest-southeast" line on mirror 1. In FIG. 2B, the edges of mirror 1 are shown exaggerated in a convex manner. In this way, the edges of the incoming laser beam are deflected outwardly to form the corners of the outgoing square beam.

The shape of surface 4 of mirror 1 is a key feature of the invention, and is described by an empirically derived relationship. To orient the reader, FIG. 3 shows the coordinate axis which is used to define terms. In FIG. 3, mirror 1 is shown where coordinates in the X and Y plane define a "best-fit" plane of the mirror, that is, a base plane from which the aberrations in the reflective surface 4 will be defined. An axis Z extends perpendicularly from the plane defined by X and Y. The distance to a particular point at which an incident laser beam contacts the mirror surface is shown as "r" and the angle between the defined X axis and "r" is defined as "$\beta$."

Using these definitions the reflective surface transforms can be derived as follows. Other details relating to certain aspects of this derivation are found in the paper "Transforming a Circular Laser Beam Into a Square or Trapezoid—Almost" in Optical Engineering, Feb. 1992, the entire contents of which are incorporated herein by reference.

For both square and triangular beam transforms, the wavefront aberration needs to fill in the corners and flatten the sides as the beam propagates. This symmetry suggests a wavefront function:

$$W_m(r,\beta) = F_m(r)\cos(m\beta). \tag{1}$$

where m is the number of sides of the polygonal shape to be formed, i.e. m=4 for a square and m=3 for a triangle or a high aspect ratio trapezoid. The functions $F_m(r)$ are chosen to minimize the variation of the intensity in the transformed beam, assuming that the round beam is uniform. Given an area magnification of 1, this means that differential areas in the round beam should maintain the same area in the transformed beam, even though they may change shape. This requirement is satisfied to the first order when the Laplacian operator is applied to the wavefront, as indicated in the following paragraphs.

For simplicity, the development is first done in Cartesian coordinates. Later, the polar form of the Laplacian is used to calculate the actual wavefront functions. To do this it is first necessary to equate the differential areas in the circle and square.

$$\delta A = \delta A' \tag{2}$$

or in Cartesian coordinates, $$\delta x \delta y = \delta x' \delta y'. \tag{3}$$

Next, the wavefront curvatures departing from the aberrating element are defined as $c_x$ and $c_y$. These are the second derivatives of the wavefront in the x and y directions. The distances to the foci are the inverse of these wavefront curvatures.

Using these definitions, a relationship can be derived between $\delta x$ and $\delta x'$ and for $\delta y$ and $\delta y'$. These relationships are $$\delta x' = \delta x \frac{1/c_x}{1/c_x - L}, \tag{4}$$

$$\delta y' = \delta y \frac{1/c_y}{1/c_y - L}, \tag{5}$$

Solving Eqs. (3), (4), and (5) together gives a nonlinear relationship between the two wavefronts curvatures $$c_x = -\frac{c_y}{1 - c_y L}. \tag{6}$$

If the beam does not distort too much, then $c_y L$ is much less than 1. This allows Eq. (6) to be linearized:

$$c_x + c_y = -c_y \epsilon \sim 0, \quad \epsilon = c_y L + (c_y L)^2 + \ldots, \tag{7}$$

where $\epsilon$, the nonlinear term, is very small.

The curvatures $c_x$ and $c_y$ can be written in terms of derivatives of the wavefront and substituted into Eq. (7), producing the Laplacian in Cartesian coordinates $$\frac{\delta^2 W}{\delta x^2} + \frac{\delta^2 W}{\delta y^2} = \nabla^2 W \sim 0. \tag{8}$$

In one mode of the invention it is preferred to use the Laplacian in polar coordinates:

$$\nabla^2 W = \frac{\delta^2 W}{\delta r^2} + \frac{\delta W}{r \delta r} + \frac{\delta^2 W}{r^2 \delta \beta^2} = 0 \tag{9}$$

Inserting the general wavefront function, Eq. (1), into Eq. (9), we find that $F_m(r) = r^m$. Putting this result back into Eq. (1) yields the wavefront of the aberrating element $$W_m(r, \beta) = k_m r^m \cos(m\beta). \tag{10}$$

Written in another form to separate out the constant $k_m$:

$$W_m(r,\beta) = k_m R^2/L \, (r/R)^m \cos(m\beta) \tag{11}$$

Once this wavefront is determined m can be selected to produce the desired transform. Note that R is the radius of the input beam and L is the spacing between the aberrating and the recollimating elements. The round-to-rectangular transform results from the choice m=4. The constant $k_4$ will be selected such that the beam shape after propagation fits inside a square and does not seriously violate the linearization condition [ε~0 in Eq. (7)]; thus the intensity is relatively uniform. The resulting most preferred aberration function is $$W_s(r,\beta) = -0.030 \, R^2/L \, (r/R)^4 \cos(4\beta). \tag{12}$$

For this round to square transform, it was found that the aberrated shape fills 97% of the square and has an intensity that varies from 100% to 126% of the input value. Variations from these values which would form acceptable square output beams are obtained by varying $k_m$ as desired. For example, it is preferred that the $k_m$ value of −0.030 can range from −0.015 to −0.050 while still achieving a good "fill" of the square and without an unacceptable variation in the intensity of the beam in the transformation.

The round-to-triangular transform can be developed in the same way as Eq. (12) except that m=3.

$$W_t(r,\beta) = -0.060 \, R^2/L \, (r/R)^3 \cos(3\beta). \tag{13}$$

Again, the constant $k_3 = -0.60$ was chosen such that the intensity in the triangle is reasonably uniform. For this transform, it was found that of an equilateral triangle is unilluminated. The intensity varies from 100% to 135%. A greater value of $k_3$ would improve the fit, and significantly increase the intensity variation. Depending on the performance of the transformed beam which is required, the value of $k_m$ can vary from 0.03 to 0.15.

Higher harmonics of these equations can also be considered to identify the best fit of the outgoing beam with the polygonal shape which is required. For example the equation $$W_m(r,\beta) = k^m R^2/L \, (r/R)^m \cos(m\beta) + k_{m,2} R^2/L \, (r/R)^2 \cos(2m\beta) \tag{14}$$

can be used. For this equation, values of $k_m$ can range from −0.02 to −0.06. In a preferred embodiment $k_m$ is preferably −0.038 and $k_{m,2}$ is preferably 0.012 (and can vary in a range of about 0 to −0.03). While this function improves the shape slightly, it introduces greater variation in intensity.

Those skilled in the art will also understand that the square and triangle solutions could be added together to create trapezoids of lesser aspect ratio, for example, using the equation:

$$W_{trap}(r,\beta) = \epsilon W_3(r,\beta) + (1-\epsilon) W_4(r,\beta)$$

where ε ranges from 0 to 1.

The value of the mirrors having surfaces defined by the transforms described is that they improve system efficiency by matching the beam shape to the reaction chamber, flow channel, etc. These "beam reshapers" are particularly useful in flowing laser chemistry systems and transversely pumped dye laser systems.

Flowing laser chemistry systems are usually illuminated from the side, and the reaction chamber is frequently a rectangular volume. A rectangular, collimated laser beam can exactly fill this channel, which maximizes system efficiency. For the same reasons, side-pumped dye lasers can be made more efficient if the pump beam is rectangular and collimated. A uniform-intensity pump beam also amplifies the dye beam intensity as uniformly as possible.

The reaction chambers for some laser chemistry systems are expanding ducts, for example, a supersonic nozzle. If side illumination is needed, a collimated beam with a trapezoidal cross section could exactly fill the chamber, thus maximizing its efficiency.

The round-to-trapezoid transform is also useful in large transversely pumped dye lasers. The efficiency in a dye amplifier can be improved if the dye beam is expanding while being applied, as would be the case in a trapezoidal channel. This tends to keep the intensity of the dye beam from increasing, so the beam can be maintained at the optimum level for energy conversion.

Suggested Construction Methods

Construction of conventional optical elements having the high-order aberrations described is best be done using binary optics technology. See, e.g., G. J. Swanson and W. B. Veldkamp, "Diffractive optical elements for use in infrared systems," Opt. Eng. 28(6):605–608 (1989), which is incorporated herein by reference. Using this methodology any wavefront function that can be described to a computer can be turned into a high-efficiency holographic element.

Generally a prescription for the beam-aberrating elements is relatively straightforward because of a closed-form solution for the wavefront function which is described in Example 1. The recollimating element does not have a closed-form solution. A method of generating the recollimating element's wavefront function is described in Example 2. These transforms were developed assuming geometric optics and ignoring diffraction.

EXAMPLE 1

Constructing an Aberrating Element

The fringe pattern describing a binary optical element is a topographic map of the desired wavefront. The j'th fringe in this pattern must satisfy the following equation:

$$W_m(r,B) = j\lambda. \tag{14}$$

Where the wavefront aberration $W_m(r,B)$ is Eq. (11) or (12). The fringe number, j, is an integer that can be positive, negative or zero.

The fringe shapes can be determined very easily because Eqs. (11) and (12) can be inverted to give the radius r in terms of the angle B and the fringe number j of Eq. (14).

EXAMPLE 2

Constructing a Recollimating Element

It should be noted that the mirror of the invention can be used without a recollimating element, i.e. where the output beam is used at a distance L from the mirror. However, the recollimating element as shown in FIG. 1 which can be used is described mathematically, but not with a closed-form solution. The following is a method of generating the fringe pattern for this element.

The light impinging on the aberrator is collimated, as the light should be when departing the recollimator 6. Hence, along any ray, the slope of the wavefront function of the two elements ($W_1$ and $W_2$) must be equal and opposite. The wavefront slope equivalence is $$\frac{\delta W_2(x_2,y_2)}{\delta x_2} = -\frac{\delta W_1(x_1,y_1)}{\delta x_1}, \tag{15}$$

$$\frac{\delta W_2(x_2,y_2)}{\delta y_2} = -\frac{\delta W_1(x_1,y_1)}{\delta y_1}.$$

A ray from point $(x_1,y_1)$ intercepts the recollimator at a location $(x_2, y_2)$ given by $$x_2 = x_1 + L \frac{\delta W_1(x_1, y_1)}{\delta x_1},$$

$$y_2 = y_1 + L \frac{\delta W_1(x_1, y_1)}{\delta y_1},$$

(16)

The recollimator can be numerically generated from Eqs. (14), (15), and (16) as follows. First, a square array of rays might be traced through the aberrator to the recollimator using Eq. (16). This gives an array of points on the recollimator. The wavefront slopes at those points are known from Eq. (16). This array will not be square, however, the slopes can be numerically integrated over these points to give the wavefront. Finally, using Eq. (14), the fringe pattern of the recollimator can be calculated from the wavefront.

It should be understood that various alternatives to the structures described herein may be employed in practicing the present invention. It is intended that the following claims define the invention and that the structures and methods within the scope of these claims and their equivalents be covered thereby.

What is claimed is:

1. A laser beam reshaping system comprising a mirror having a laser beam reflective surface for converting an incident laser beam having a circular cross-section to an output beam having a polygonal cross-sectional shape at a distance L from said surface, said mirror defining a mirror plane and an axis Z normal to said mirror plane, each point on said reflective surface being described by an equation $$W_m(r, \beta) = k_m R^2/L \, (r/R)^m \cos(m\beta)$$

where m equals the number of sides of said polygonal cross-sectional shape, W is the deviation of said reflective surface from said mirror plane along said Z axis, R is the radius of said incident beam, r and $\beta$ are the cylindrical coordinates of said points on said mirror plane, and $k_m$ is an empirically selected variable.

2. A laser beam reshaping system as in claim 1 wherein m is 4 and $k_m$ ranges from −0.015 to −0.05.

3. A laser beam reshaping system as in claim 2 wherein m is 4 and $k_m$ is −0.030.

4. A laser beam reshaping system as in claim 1 wherein m is 3 and $k_m$ ranges from −0.030 to −0.15.

5. A laser beam reshaping system as in claim 4 wherein m is 3 and $k_m$ is −0.060.

6. The laser beam reshaping system of claim 1, wherein said reflective surface is nonsegmented.

7. A laser beam reshaping system as in claim 1, wherein: said reflective surface is described by a higher harmonic of said equation.

8. A laser beam reshaping system comprising:

a laser emitting a laser beam having a circular cross-section; and a mirror positioned to receive the laser beam and having a laser beam reflective surface for converting the laser beam to an output beam having a polygonal cross-sectional shape at a distance L from said surface, said mirror defining a mirror plate and an axis Z normal to said mirror plane; and a collimating element positioned the distance L from the mirror plane, the collimating element collimating the polygonal cross-sectional shape of the output beam; and wherein each point on said reflective surface is described by an equation $$W_m(r, \beta) = k_m R^2/L(r/R)^m \cos(m\beta)$$

where m equals the number of sides of said polygonal shape, W is the deviation of said reflective surface from said mirror plane along said Z axis, R is the radius of said incident beam, r and $\beta$ are the cylindrical coordinates of said points on said mirror plane, and $K_m$ is an empirically selected variable.

9. The laser beam reshaping system of claim 8, wherein m is 4 and $k_m$ ranges from −0.015 to −0.05.

10. The laser beam reshaping system of claim 9, wherein $k_m$ is −0.030.

11. The laser beam reshaping system of claim 8, wherein m is 3 and $k_m$ ranges from −0.030 to −0.15.

12. The laser beam reshaping system of claim 11, wherein $k_m$ is −0.060.

13. The laser beam reshaping system of claim 9, wherein said reflective surface is nonsegmented.

14. The laser beam reshaping system of claim 8, wherein said polygonal cross-sectional shape comprises a triangle.

15. The laser beam reshaping system of claim 8, wherein said polygonal cross-sectional shape comprises a square.

16. A laser beam reshaping system as in claim 8, wherein:

said reflective surface is described by a higher harmonic of said equation.

17. A method for reshaping a laser beam comprising:

providing an incident beam having a circular cross-section;

reflecting said incident beam on a reflective surface, the reflective surface producing an output beam having a polygonal cross-sectional shape at a distance L from the reflective surface, wherein each point on said reflective surface is described by an equation $$W_m(r, \beta) = k_m R^2/L(r/R)^m \cos(m\beta)$$

where m equals the number of sides of said polygonal shape, W is the deviation of said reflective surface from a mirror plane along an axis normal to the mirror plane, R is the radius of said incident beam, r and $\beta$ are the cylindrical coordinates of said points on said mirror plane, and $K_m$ is an empirically selected variable; and positioning a collimating element at the distance L from the reflective surface to receive the output beam having the polygonal cross-sectional shape.

* * * * *